(12) United States Patent
Tran et al.

(10) Patent No.: US 11,235,805 B2
(45) Date of Patent: Feb. 1, 2022

(54) ADAPTIVE VEHICLE-PROXIMITY GUIDANCE

(71) Applicant: International Business Machines Corporation, Armonk, NY (US)

(72) Inventors: Khoi-Nguyen Dao Tran, Southbank (AU); Nebula Alam, Glenroy (AU)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 16/288,204

(22) Filed: Feb. 28, 2019

(65) Prior Publication Data

US 2020/0277008 A1 Sep. 3, 2020

(51) Int. Cl.
*B62D 15/02* (2006.01)
*B60R 1/00* (2006.01)
*B60Q 9/00* (2006.01)

(52) U.S. Cl.
CPC ............ *B62D 15/0295* (2013.01); *B60Q 9/00* (2013.01); *B60R 1/002* (2013.01); *B60R 2300/804* (2013.01); *B60R 2300/8093* (2013.01)

(58) Field of Classification Search
CPC ........... G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06K 2209/23; G06T 2207/30236; G06T 2207/30248; G06T 2207/30252; G06T 2207/30256; G06T 2207/30261; G06T 2207/30264; G06T 2207/30268; G08G 1/16; G08G 1/116; G08G 1/167; G08G 1/168; G08G 1/20; B60W 50/14; B60W 2050/143; B60W 2550/10; B60W 2550/14;
(Continued)

(56) References Cited

U.S. PATENT DOCUMENTS 6,731,202 B1 5/2004 Klaus
9,481,287 B2 * 11/2016 Marti ................. B60Q 1/00
(Continued)

FOREIGN PATENT DOCUMENTS

DE 102016007764 A1 12/2017
WO 2018162221 A1 9/2018

OTHER PUBLICATIONS

"Safety Technologies for Heavy Vehicles and Combinations," Transport for NSW, Jun. 2017, 36 pages. ISBN 978-1-925659-06-1 <http://roadsafety.transport.nsw.gov.au/downloads/safety-technologies-heavy-vehicles.pdf>.
(Continued)

*Primary Examiner* — Nathnael Aynalem
(74) *Attorney, Agent, or Firm* — Jamar K. Ray (57) ABSTRACT

A method for providing adaptive vehicle-proximity guidance may include monitoring transit-condition data of a roadway traversed by a user-vehicle. The method may further include determining, based at least in part on the transit-condition data, a proximity zone. The method may further include generating a first visual representation that corresponds to the proximity zone. The method may further include displaying the first visual representation onto the roadway proximate the proximity zone and updating the first visual representation in response to detected changes in the transit-condition data.

16 Claims, 7 Drawing Sheets

(58) Field of Classification Search
CPC .............. B60R 2001/1215; B60R 1/00; B60R 2025/1013; B60R 2025/1016; B60R 2300/105; B60R 2300/106; B60R 2300/806; B60R 2300/8066; B60R 2300/8073; B60R 2300/8086; B60R 2300/8093; B60R 1/002; B60R 1/003; B60R 2300/804; B60R 2300/103; B60R 2300/802; G01S 17/93; G01S 17/931; B62D 15/029; H04W 4/40; B60Q 1/24; B60Q 1/525; B60Q 9/008; B60Q 9/007; B60Q 1/54
USPC ............................................................ 348/148
See application file for complete search history.

(56) References Cited

U.S. PATENT DOCUMENTS

| | | | | |
|---|---|---|---|---|
| 9,845,046 | B1* | 12/2017 | Arceo | B60Q 1/525 |
| 9,878,657 | B2* | 1/2018 | Wunsche, III | B62D 15/025 |
| 9,896,107 | B1* | 2/2018 | Huang | B60W 50/14 |
| 10,134,280 | B1* | 11/2018 | You | B60Q 1/34 |
| 10,272,830 | B2* | 4/2019 | Suzuki | G08G 1/005 |
| 10,311,718 | B2* | 6/2019 | Suzuki | B60Q 1/525 |
| 10,392,013 | B2* | 8/2019 | Hakki | B60Q 1/50 |
| 2008/0189040 | A1* | 8/2008 | Nasu | G08G 1/163 |
| | | | | 701/301 |
| 2012/0206252 | A1 | 8/2012 | Sherony et al. | |
| 2012/0271539 | A1* | 10/2012 | Bald | B60W 30/18163 |
| | | | | 701/300 |
| 2013/0127638 | A1 | 5/2013 | Harrison | |
| 2013/0147638 | A1 | 6/2013 | Ricci | |
| 2018/0072220 | A1* | 3/2018 | Yan | G08G 1/163 |
| 2018/0079463 | A1 | 3/2018 | Pearce | |
| 2018/0237156 | A1 | 8/2018 | Ross | |

OTHER PUBLICATIONS

"Trucks and Cars Alert Each Other in Traffic—Pioneering Cooperation between Volvo Trucks and Volvo Cars," Volvo Group Press Release, AB Volvo Media Relations, Sweden, May 7, 2018, 2 pages. <https://www.volvogroup.com/en-en/news/2018/may/news-2910040.html>.

Mell et al., "The NIST Definition of Cloud Computing," Recommendations of the National Institute of Standards and Technology, U.S. Department of Commerce, Special Publication 800-145, Sep. 2011, 7 pages.

"Bike Lane Light," This is Why I'm Broke, Printed Feb. 26, 2019, 3 pages. https://www.thisiswhyimbroke.com/bike-lane-light/.

* cited by examiner

ADAPTIVE VEHICLE-PROXIMITY GUIDANCE

BACKGROUND

The present disclosure relates to vehicle safety, and more specifically, to collision avoidance.

Navigating a vehicle in proximity to another vehicle may require determining and maintaining a safe distance from the other vehicle. Determining and maintaining such a safe distance may be facilitated.

SUMMARY

Some embodiments of the present disclosure can be illustrated as a method for providing adaptive vehicle-proximity guidance. The method may comprise monitoring transit-condition data of a roadway traversed by a user-vehicle. The transit-condition data may comprise roadway-characteristic data. The method may also comprise determining, based at least in part on the roadway-characteristic data, a first proximity zone. The method may also comprise generating a first visual representation that corresponds to the first proximity zone. The method may also comprise displaying the first visual representation onto the roadway proximate the first proximity zone. The method may also comprise detecting a change in the transit-condition data. The method may also comprise updating the visual representation in response to the detecting, resulting in an updated first visual representation.

Some embodiments of the present disclosure can be illustrated as a system for providing adaptive vehicle-proximity guidance. The system may comprise a set of sensors configured to monitor transit-condition data of a user vehicle in transit. The system may also comprise the transit-condition data comprising user-vehicle data. The system may also comprise a processor configured to determine, based at least in part on the user-vehicle data, a first proximity zone. The system may also comprise the processor being configured to generate a first visual representation that corresponds to the first proximity zone. The system may also comprise a set of illumination devices configured to display the first visual representation proximate the first proximity zone. The system may also comprise the processor further configured to update the first visual representation in response to a detected change in the user-vehicle data, resulting in an updated first visual representation.

Some embodiments of the present disclosure can be illustrated as a system for providing adaptive vehicle-proximity guidance. The system may comprise a processor. The system may also comprise a memory in communication with the processor. The memory may contain program instructions that, when executed by the processor, are configured to cause the processor to perform a method. The method may comprise monitoring transit-condition data of a roadway traversed by a user vehicle. The transit-condition data may comprise ambient-environment data. The method may also comprise determining, based at least in part on the ambient-environment data, a first proximity zone. The method may also comprise generating a first visual representation that corresponds to the first proximity zone. The method may also comprise displaying the first visual representation onto the roadway proximate the first proximity zone. The method may also comprise detecting a change in the transit-condition data. The method may also comprise updating the first visual representation in response to the detecting, resulting in an updated first visual representation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to vehicle safety; more particular aspects relate to vehicle collision avoidance technology. While the present disclosure is not necessarily limited to such applications, various aspects of the disclosure may be appreciated through a discussion of various examples using this context.

The operation of a vehicle, such as an automobile, semi-trailer truck, or motorbike, may require the operator to maintain awareness of nearby vehicles. Operating a vehicle in too close a proximity to other vehicles may result in collisions that endanger lives and/or property; thus, vehicle operators may need to continuously gauge and maintain safe distances from other vehicles during vehicle operation. Transit conditions, such as roadway characteristics, vehicle characteristics, specific vehicle maneuvers, and weather conditions, may present challenges to gauging and maintaining a safe inter-vehicular proximity, i.e., maintaining a safe distance from other vehicles. For example, a driver of a mid-sized sedan following a small van along a flat road on a clear day may face different challenges to gauging and maintaining a safe inter-vehicular proximity than a driver of a compact car attempting to merge in front of a semi-trailer truck on a downhill freeway at night. Thus, transit conditions may contribute to a dangerous environment for vehicle operation.

To address these and other problems, embodiments of the present disclosure include a system and method to facilitate determining a safe inter-vehicular proximity during vehicle operation, based on monitored transit conditions.

Embodiments of the present disclosure may generate, display, and update one or more visual representations that indicate proximity information to an observer. Such visual representations may be projected from a vehicle onto one or more sides of the vehicle and onto one or more surfaces around the vehicle, such as a roadway or lane markers on a roadway. The visual representations may be a set of features such as colors, symbols, alphanumeric characters, lines, and/or shapes. Upon observing one or more of such visual representations, an observer may be incentivized to take one or more actions regarding vehicle operation.

For example, in some embodiments of the present disclosure, a system may include user-vehicle sensors that continuously or periodically monitor roadway-characteristic data, such as roadway curvature and grade, and ambient-environment data, such as precipitation. The system, via a processing device, may use the roadway-characteristic data and the ambient-environment data to generate a visual representation that indicates a distance that may be safe for another vehicle to merge in front of the user-vehicle. The system, using one or more illumination devices, such as lasers, on the user-vehicle, may display the visual representation by projecting, an image, such as a green circle, onto the roadway at a predetermined distance in front of the user vehicle. In response, the operator of a roadway vehicle near the user vehicle may recognize that a safe distance for merging in front of the user vehicle may be the distance where the projected green circle is located. Furthermore, the processing device in this example may detect a change in the monitored roadway curvature, roadway grade, and/or precipitation, and in response, generate an updated visual representation to account for the changed conditions. Consequently, the one or more illumination devices may display the updated visual representation by projecting the green circle onto the roadway differently, such as at a changed distance in front of the user vehicle or at a modified projection angle.

By monitoring transit-condition data, i.e., data corresponding to transit conditions of a user vehicle (e.g. roadway-characteristic data, ambient-environment data, user-vehicle data, and roadway-vehicle data of one or more roadway vehicles near the user vehicle), embodiments of the present disclosure may provide inter-vehicular proximity information that is tailored to the specific transit conditions experienced by a vehicle operator at a given time. The display of this tailored proximity information as a projected visual indicator may permit vehicle operators to make accurate vehicle navigation decisions in view of their transit conditions. Accordingly, embodiments of the present disclosure may facilitate improved vehicle safety by permitting vehicle operators to better gauge and maintain safe inter-vehicular proximities.

Embodiments of the present disclosure may include a system having one or more processors for determining inter-vehicular proximity information using mathematical algorithms and/or machine learning. For example, in some embodiments, the system may determine a safe inter-vehicular proximity zone between a user vehicle and a roadway vehicle by using a monitored user-vehicle weight and velocity and a monitored roadway-vehicle velocity to calculate a potential collision time between the vehicles. In some embodiments, the system may utilize machine learning to predict a safe inter-vehicular proximity zone based on monitored acceleration, braking, and swerving patterns of the user-vehicle or a roadway vehicle. In some embodiments, the system may predict, based on a monitored user-vehicle location and navigation instructions from mapping software, that a user vehicle will be performing a specific maneuver, such as a U-turn or a wide right turn, and in response, determine one or more corresponding safe inter-vehicular proximity zones. Accordingly, embodiments of the present invention may provide versatile means for determining inter-vehicular proximity information for a range of vehicle operation scenarios.

Embodiments of the present disclosure may include one or more illumination devices for displaying visual representations. The one or more illumination devices may include devices, such as lasers and/or light-emitting diodes ("LED's") and may be configurable to project visual representations on a variety of surfaces. For example, in some embodiments, one or more illumination devices may be configured to project a visual representation on surfaces of lane markers, i.e., materials or structures provided to delineate roadway traffic lanes, such as painted lane-dividing lines and pavement marker structures attached to a roadway. Such projections onto lane markers may provide enhanced visibility of visual representations, as projecting a visual representation onto a reflective surface of a lane marker may result in a brighter or more noticeable illumination than projecting onto a less reflective surface, such as a roadway. Projections onto lane markers may also reduce the potential for unintended illuminations, such as shining laser light directly into a cabin of a roadway vehicle, as the projections may be aimed along the sides of roadway vehicles. In some embodiments, illumination devices may include sensors for continuously detecting lane marker positions relative to a user-vehicle to ensure accurate projections onto the lane markers. In some embodiments, illumination devices may project visual representations directly onto a roadway or into an atmospheric space to form a virtual image, such as a hologram, visible to vehicle operators.

Embodiments of the present disclosure may include illumination devices that are mechanically and/or electrically adjustable. For example, in some embodiments, one or more illumination devices may mechanically adjust their angle of projection to account for changes in roadway curvature when continuously projecting visual representations onto surfaces of lane markers. In some embodiments, illumination devices may adjust their illumination intensity to account for changes in ambient light or variations in roadway color. In some embodiments, illumination devices may mechanically adjust their angle of projection and/or adjust their intensity to project a visual representation at a farther distance from a user-vehicle than a previous projection. Accordingly, embodiments of the present disclosure may provide improved visibility of visual indicators, as illumination devices may adapt to an array of transit conditions.

Embodiments for the present disclosure may include illumination devices configured to display various types of proximity information as visual representations. For example, in some embodiments, the illumination devices may project regions of red, yellow, and green colors onto the roadway in front of a user vehicle to indicate, respectively, dangerous, marginally safe, and safest distances for a roadway vehicle to merge in front of the user vehicle. In some embodiments, the illumination devices may project an alphanumeric message, such as "wide load" or "hazardous materials" to indicate one or more characteristics of the user vehicle. Such a message may encourage a roadway-vehicle operator to take special precautions when in the vicinity of the user-vehicle. In some embodiments, the illumination devices may project a symbol, such as an arrow, to indicate that the user vehicle is about to turn. Additionally, in some embodiments, the illumination devices may project a set of lines, bars, or shapes, to indicate one or more blind spots or a trajectory path for a wide turn or a U-turn. Accordingly, embodiments of the present disclosure may provide versatile means for communicating circumstantially-relevant proximity information.

Embodiments of the present disclosure may include outputs that are automatic, manual, or a combination thereof. For example, in some embodiments, illumination devices may automatically display a visual representation when a roadway vehicle is located within a predetermined distance from a user vehicle. In some embodiments, a user may issue a command to activate a visual representation. For example, a user attempting to determine whether he can make a U-turn without colliding with another object, such as a parked car along the roadway, may activate a U-turn visual representation to display a present trajectory of the user-vehicle for making the U-turn. In some embodiments, the system of the present disclosure may include one or more audio devices that automatically emit sounds to alert user-vehicle operators and/or roadway-vehicle operators when determined inter-vehicular proximity information indicates a dangerous proximity or a potential collision. Accordingly, embodiments of the present disclosure provide versatile functionality for providing inter-vehicular proximity information.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
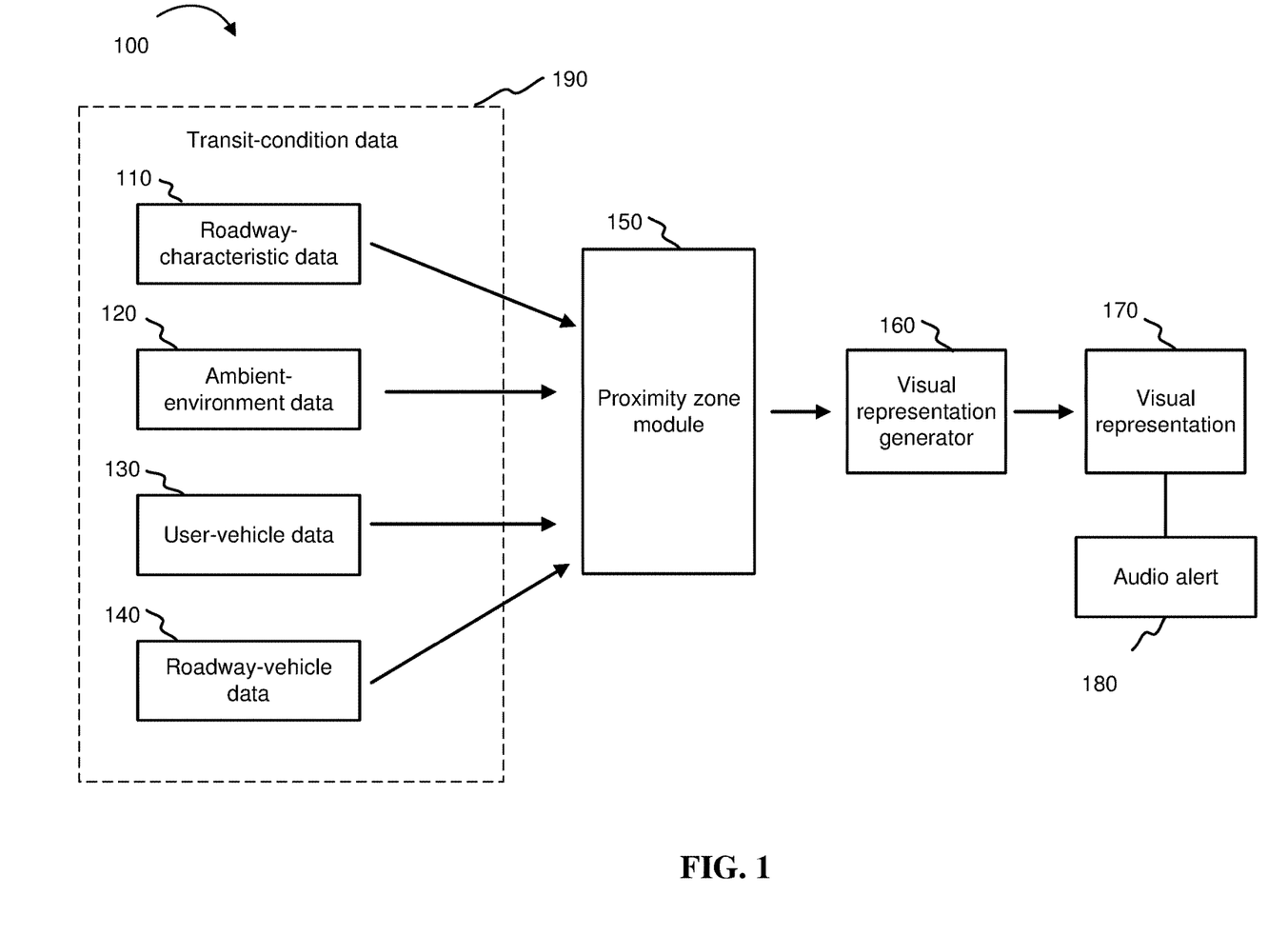
FIG. 1 depicts an example system block diagram, in accordance with embodiments of the present disclosure.

Turning to the figures, FIG. 1 illustrates a block diagram of an example system 100 according to the present disclosure. System 100 may include monitored transit-condition data 190 obtained from sources such as such as sensing devices, cameras, global positioning system ("GPS") devices, speedometers, accelerometers, in-vehicle data storage/processing devices, and/or web-based resources. The monitored transit-condition data 190 may include roadway-characteristic data 110, ambient-environment data 120, user-vehicle data 130, and/or roadway-vehicle data 140, and it may be transferred to a proximity-zone module 150 for processing and/or analysis. A discrete or integrated visual representation generator 160 may determine the specific design of one or more visual representations 170 to be displayed. Additionally, the visual representation 170 may mark one or more threshold distances, and the presence of a roadway vehicle within the one or more threshold distances may trigger an audio alert 180 to vehicle operators to warn of a dangerous proximity or a potential collision. In some embodiments, audio alert 180 may include a set of spoken words or tones.

For example, in some embodiments, the visual representation may be a projection of a colored rectangle onto the roadway in front of a user vehicle to indicate a proximity zone where a collision is highly likely to occur. Additionally, one or more sensing devices may be configured to detect the presence of a roadway vehicle within the projected colored rectangle and within the proximity zone. Upon such a detection, a processor may automatically sound the horn of the user vehicle. In some embodiments, upon such a detection, a processor may automatically command one or more audio devices to emit a spoken alert, such as "VEHICLE DANGER," within the user vehicle and outside of the user vehicle, such that the alert may be audible within the roadway vehicle.

In some embodiments, the visual representation may be a computer-readable image, such as a barcode, that may convey information such as vehicle proximity information or user-vehicle information (e.g. hazardous materials onboard). The computer-readable image may be detectable by a device (e.g. a camera or a barcode reader) onboard a roadway vehicle, such as an autonomous car. Detection of the computer readable image may incentivize an action by a roadway vehicle operator (e.g., a human driver or a computer of an autonomous vehicle).

For example, in some embodiments, a camera onboard an autonomous roadway vehicle may detect a visual representation that is computer-readable image. A processing device, such as a computer, in communication with the camera may interpret the barcode as an indication that a truck in front of the autonomous vehicle is rapidly decelerating due to a flat tire. In response, a computer operating the autonomous vehicle may take an action such as slowing down the autonomous vehicle or changing the driving lane of the autonomous vehicle.

Roadway-characteristic data 110 may provide information about one or more physical characteristics of a roadway. In some embodiments, roadway-characteristic data 110 may include information regarding the surface traction and/or roughness of the roadway traversed by a user vehicle. In some embodiments, roadway-characteristic data may include a value, such as an estimated coefficient of friction between the user-vehicle tires and a wet or icy roadway, stored on an in-vehicle computer. In some embodiments, roadway-characteristic data may include web-based information indicating that a portion of a roadway is currently unpaved due to present roadway construction. In some embodiments, the roadway-characteristic data may include an output from a vehicle sensor configured to detect a characteristic such as the presence of roadway bumps or pot holes, the presence of snow and/or liquids on the roadway, or a type or roadway surface (e.g., dirt, concrete, or asphalt).

In some embodiments, roadway-characteristic data 110 may include information regarding design characteristics of the roadway. For example, in some embodiments, roadway-characteristic data may include an approximation of a roadway grade and/or curvature derived from accelerometer measurements, GPS device data, and/or a database of roadway properties. In some embodiments, roadway-characteristic data may include a determination of a roadway color based on roadway images obtained by an onboard vehicle camera or from satellite imagery. In some embodiments, roadway-characteristic data may include an identification of roadway lane marker attributes, such as length, width, surface area, color, shape, size, and/or spacing. Such attributes may be detected by an onboard vehicle camera and identified by a processor implementing digital image analysis techniques and/or machine learning.

In some embodiments, ambient-environment data 120 may include weather and/or location data. For example, in some embodiments, an on-board vehicle sensor may detect one or more ambient conditions, such as precipitation, visibility (e.g. fog or bright or dim ambient light), or freezing conditions. In some embodiments, a GPS navigation device may determine that a user-vehicle is located at a city intersection and is about to make a left turn during a period of high traffic.

In some embodiments, user-vehicle data 130, i.e., data regarding the movement, contents, or characteristics of vehicle that is using the system 100, may include parameters such as braking patterns, swerving patterns, a speed and/or acceleration of the user-vehicle, and whether the user-vehicle is traveling in a cruise control status. In some embodiments, the user-vehicle data may include information that describes user-vehicle characteristics such as its size (e.g. a truck carrying a wide load) or its contents (e.g. a truck carrying hazardous materials). In some embodiments, the user-vehicle data may identify a specific user-vehicle maneuver, such as a U-turn, sharp left turn, or a right turn.

In some embodiments, user-vehicle data 130 may include information about driving patterns of the user-vehicle. For example, in some embodiments, sensors may collect information about user-vehicle braking, acceleration, sharp turns, and/or swerving. Such information may be analyzed by the proximity zone module to predict a state of the vehicle operator, such as whether the vehicle operator is fatigued or impaired. In some embodiments, the user-vehicle data may include in-vehicle images of a vehicle operator that may be used to predict a level of alertness of the vehicle operator.

In some embodiments, roadway-vehicle data 140, i.e., data regarding one or more vehicles in the vicinity of a user-vehicle, may include location data of the roadway vehicle relative to the user vehicle. For example, in some embodiments user-vehicle sensors and/or cameras may determine that a roadway vehicle is traveling behind a user vehicle with a 10 mile-per-hour relative velocity. In some embodiments, the roadway-vehicle data may include an acceleration of the roadway vehicle. In some embodiments, the roadway-vehicle data may include information about driving patterns of the roadway vehicle. For example, in some embodiments, proximity sensors and one or more cameras onboard the user-vehicle may detect braking and swerving patterns of a roadway vehicle. Such information may be analyzed by the proximity zone module 150 to predict that the roadway vehicle may intend to merge in front of the user vehicle.

In some embodiments, the proximity zone module 150 may include one or more processors for storing, analyzing, and processing transit-condition data 190. In some embodiments, the proximity zone module may determine one or more proximity zones. A proximity zone may indicate proximity information, such as a blind spot or a projected vehicle trajectory. In some embodiments, a proximity zone may indicate a region or a set of distances from the user vehicle where a collision is highly likely to occur, less likely to occur, and/or least likely to occur, based on monitored transit-condition data.

In some embodiments, the proximity zone module 150 may communicate with an array of devices, such as one or more external storage and/or processing devices, such as one or more servers. In some embodiments the proximity zone module may be located onboard the user-vehicle; in some embodiments the proximity zone module may be located remote from the user-vehicle. In some embodiments, the proximity zone module may communicate with devices, such as sensing devices, cameras, global positioning system ("GPS") devices, speedometers, accelerometers, in-vehicle data storage/processing devices, and/or web-based resources. In some embodiments the proximity zone module may communicate with the visual representation generator 160, audio devices, and/or illumination devices. In some embodiments the proximity zone module may be configured to execute machine learning processes regarding monitored data.

In some embodiments, the visual representation generator 160 may include one or more processors for determining the parameters of a visual representation 170. Such parameters may include a set of colors, symbols, alphanumeric characters, lines, and/or shapes. In some embodiments, the visual representation generator may execute a set of instructions to illumination devices and/or audio devices to project proximity information.

In some embodiments, visual representation 170 may be displayed proximate a proximity zone that is not visibly displayed. For example, a visual representation may be displayed within, adjacent to, or around a proximity zone (e.g. so as to circumscribe a proximity zone). In some embodiments, visual representation 170 may be displayed within a distance such as 1 or 2 meters from a proximity zone.

Figure 2:
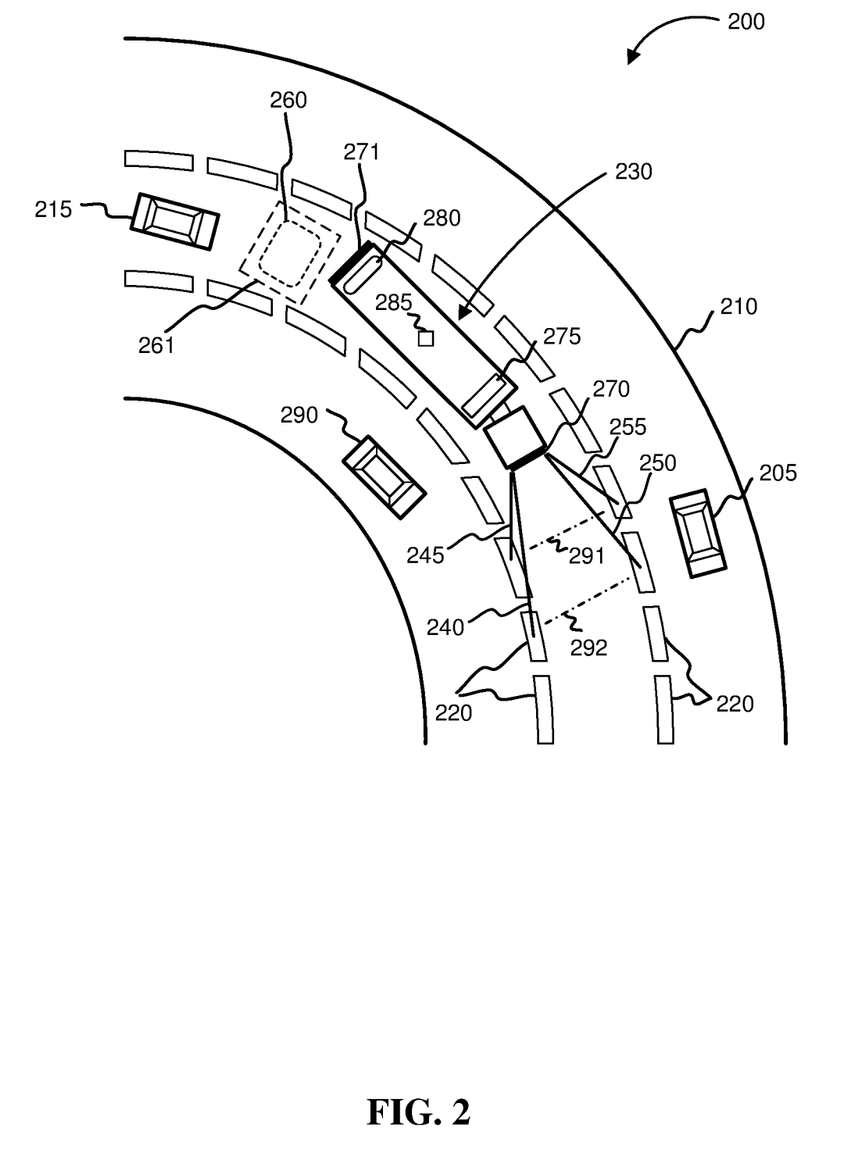
FIG. 2 depicts a top view of a curved roadway where visual representations are projected from a vehicle, in accordance with embodiments of the present disclosure.

FIG. 2 illustrates a top view of a curved-roadway environment 200 according to embodiments of the present disclosure. In some embodiments, roadway 210 may be an expressway. In some embodiments, roadway 210 may be a multi-lane street. Roadway 210 contains lane markers 220 (e.g. painted lines and/or mounted structures) that define lane boundaries of roadway 210. Roadway 210 may include a user vehicle 230, such as a semi-trailer truck. In some embodiments, user vehicle 230 may be a different vehicle, such as a consumer automobile, van, motorbike, bicycle, bus, or truck. Roadway 210 may include a roadway vehicle 290 on the right side of the user vehicle 230, a roadway vehicle 205 on the left side of the user vehicle 230, and a roadway vehicle 215 behind the user vehicle 230.

User vehicle 230 may include a set of cameras 275, proximity sensors 280, front illumination devices 270, and rear illumination devices 271. Front illumination devices 270 and rear illumination devices 271 may take the form of, for example, a set of lasers or a set of LEDs. User vehicle 230 may also include a processor 285 having a proximity zone module and a visual representation generator.

In operation, as user vehicle 230 traverses roadway 210, cameras 275 may monitor roadway-characteristic data, such as roadway 210 curvature and lane marker 220 physical characteristics (e.g. length, width, surface area, color, shape, size, and/or spacing). Additionally, proximity sensors 280 and cameras 275 may monitor roadway-vehicle data, such as the locations of roadway vehicles 205, 215, and 290, relative to the user vehicle 230, and the relative velocities of roadway vehicles 205, 215, and 290.

The processor 285 may receive the monitored data and, in response, determine a rear proximity zone 260. The rear proximity zone 260 is not visibly displayed; rather, it represents a region where a visual representation 261 may be visibly displayed. Rear proximity zone 260 may represent a region behind the user vehicle in which a probability of a collision between user vehicle 230 and roadway vehicle 215 may be high in view of the relative velocity between the two vehicles. The processor 285 may instruct the rear illumination devices 271 to project a visual representation 261, such as a red, rectangular shape around the rear proximity zone 260. The visual representation 261 may notify the operator of the roadway vehicle 215 that moving into the region where the visual representation 261 has been projected may result in a dangerous driving condition.

In some embodiments, the processor 285 may further receive monitored user-vehicle data corresponding to one or more driving patterns of the user-vehicle, such as braking patterns, acceleration patterns, and swerving patterns. Based on the monitored user-vehicle data, the processor, using machine learning methods, may predict that the user-vehicle operator has become fatigued. In response to the prediction, the processor 285 may instruct the rear illumination devices 271 to update the visual representation 261, such as by projecting an alphanumeric message, increasing the size, changing the color, or increasing the distance from the user vehicle where the visual representation 261 is displayed.

In some embodiments, processor 285 may receive monitored roadway-vehicle data and roadway-characteristic data and determine a set of front proximity zones 291, 292, based on the relative velocity between user vehicle 230 and roadway vehicle 290 as well as the curvature of the roadway. Front proximity zone 291 (not visibly displayed onto roadway 210) may represent a distance in front of the user vehicle 230 at which a probability of collision would exceed a threshold if roadway vehicle 290 attempted to merge in front of user vehicle 230 at that distance. Front proximity zone 292 (not visibly displayed onto roadway 210) may represent a distance in front of the user vehicle 230 at which a probability of collision would not exceed a threshold if roadway vehicle 290 attempted to merge in front of user vehicle 230 at that distance. The processor 285 may instruct the front illumination devices 270 to project a set of visual representations 245, 255, 240, and 250 onto lane markers 220 along the roadway 210 to indicate the two proximity zones. For example, visual representations 245 and 255 may be a set of red lines that shine directly onto the lane markers and represent an unsafe merging distance corresponding to front proximity zone 291. Visual representations 240 and 250 may be a set of green lines that shine directly onto the lane markers and represent a safer merging distance corresponding to front proximity zone 292. Such visual representations may indicate to the operator of roadway vehicle 290 where it may be safe to merge in front of user vehicle 230.

In some embodiments, the processor 285, based on physical characteristics of lane markers 220 monitored by cameras 275, may instruct front illumination devices 270 to display the set of visual representations 245, 255, 240, and 250, approximately within a width of lane markers 220 or approximately within a surface area of lane markers 220. In these embodiments, the front illumination devices 270 may adjust their projection angles or illumination intensities to account for changes in roadway curvature or grade, such that the visual representations may be continuously projected onto lane markers 220. In these embodiments, by displaying the set of visual representations approximately within boundaries of the lane markers 220, the illumination devices may reduce the risk of projecting light into roadway vehicles and causing a hazardous driving condition.

In some embodiments, the processor 285 may receive monitored roadway-characteristic data from the set of cameras 275 indicating that the user vehicle is no longer traversing a curved roadway. In response, the processor may determine that the positions of front proximity zones 291, 292 relative to the user vehicle 230 have changed (e.g. the processor may determine that front proximity zones 291, 292 may be positioned a shorter distance from the user vehicle on a straight roadway than on a curved roadway). As a result, the processor 285 may instruct the front illumination devices 270 to update the set of visual representations 245, 255, 240, and 250, such that their distances from the user vehicle are reduced. In these embodiments, the visual representations may accurately indicate proximity zones despite changes in roadway-characteristic data.

Figure 3:
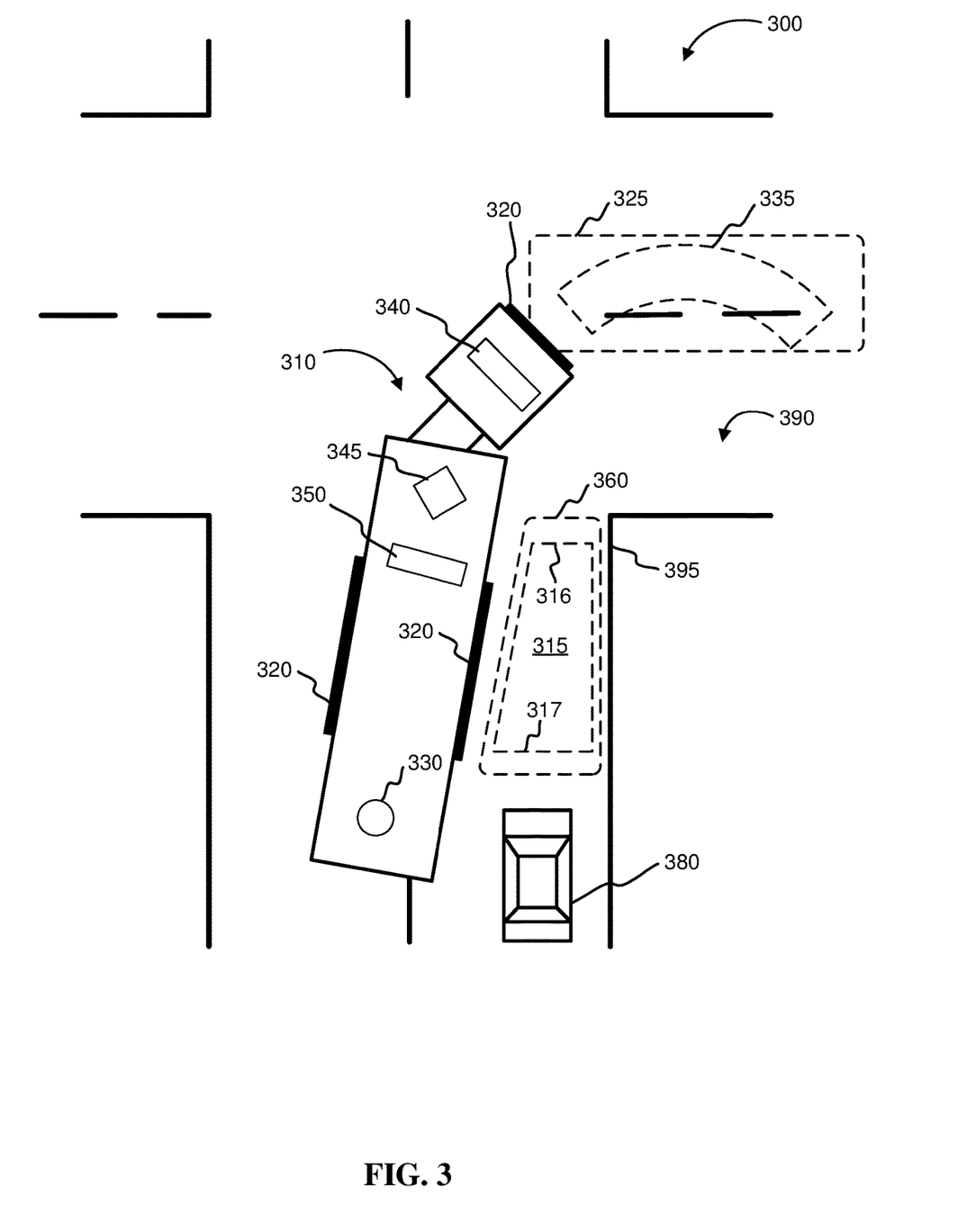
FIG. 3 depicts visual representations for an example maneuver in accordance with embodiments of the present disclosure.

FIG. 3 illustrates a roadway intersection 300 according to embodiments of the present disclosure. Intersection 300 may include a roadway vehicle 380 following a user vehicle 310. User vehicle 310 is illustrated as a semi-trailer truck initiating a wide right turn onto the roadway 390. However, user vehicle 310 may be a different vehicle, such as a consumer automobile, van, motorbike, bicycle, truck, shuttle, bus, or limousine, making a turn onto the roadway 390. According to embodiments of the present disclosure, user vehicle 310 may project one or more visual representations 315, 335 to reduce the likelihood of a collision during the wide right turn.

User vehicle 310 may be equipped with one or more illumination devices 320, an audio device 330, one or more cameras 340, a GPS navigation system 350, and a processing device 345. The processing device 345 may receive monitored roadway-vehicle data (e.g. an indication that roadway vehicle 380 is located approximately 15 feet behind the user vehicle) from the one or more cameras 340. The processing device may additionally receive monitored user-vehicle data from the GPS navigation system, such as an indication that the user vehicle is about to execute a wide right turn. In response to the received data, processing device 345 may determine a proximity zone 360 (which is not visibly displayed onto roadway 390) that represents a region where a collision may occur if a roadway vehicle is present. Additionally, processing device 345 may cause illumination devices 320 to project a visual representation 315, such as the word "DANGER" onto the roadway and within the proximity zone.

In some embodiments, visual representation 315 may be a set of colored lines within a shape, such as the quadrilateral shape illustrated in FIG. 3. Additionally, in some embodiments, the illumination devices 320 may modify the size and shape of visual representation 315 as the user vehicle 310 progresses through a turn. For example, as user vehicle 310 progresses through the wide right turn shown in FIG. 3, illumination devices 320 may modify the visual representation 315 such that the upper portion 316 of the visual representation becomes shorter and the lower portion 317 of the visual representation becomes longer in response to a changed distance between the user vehicle 310 and a reference structure 395, such as a curb or barrier.

As a result of the visual representation 315, the operator of the roadway vehicle 380 may be put on notice not to enter the proximity zone 360 to avoid a potential collision. Additionally, if cameras 340 indicate that roadway vehicle 380 has entered the proximity zone 360, processing device 345 may cause audio device 330 to emit a sound, such as a tone or verbal warning, to alert the user-vehicle operator and the roadway-vehicle operator of a potential collision.

Additionally, in response to the received data, processing device 345 may determine a proximity zone 325 in front of the user vehicle 310 that is not visibly displayed and represents another region where a collision may occur if a roadway vehicle is present. Additionally, processing device 345 may cause illumination devices 320 to project a visual representation 335 in the form of a set of lines through the proximity zone 325 that show the trajectory path of the user vehicle 310. Furthermore, in some embodiments, the illumination devices may modify the visual representation 335, such as by changing the length or color of the visual representation, in response to the movement of the user vehicle through the trajectory path. Observation of the visual representation may permit the user-vehicle operator or a roadway-vehicle operator to recognize a potential collision when a roadway vehicle or other object is within the proximity zone. Accordingly, the user-vehicle operator or a roadway-vehicle operator may act to avoid the collision.

Figure 4:
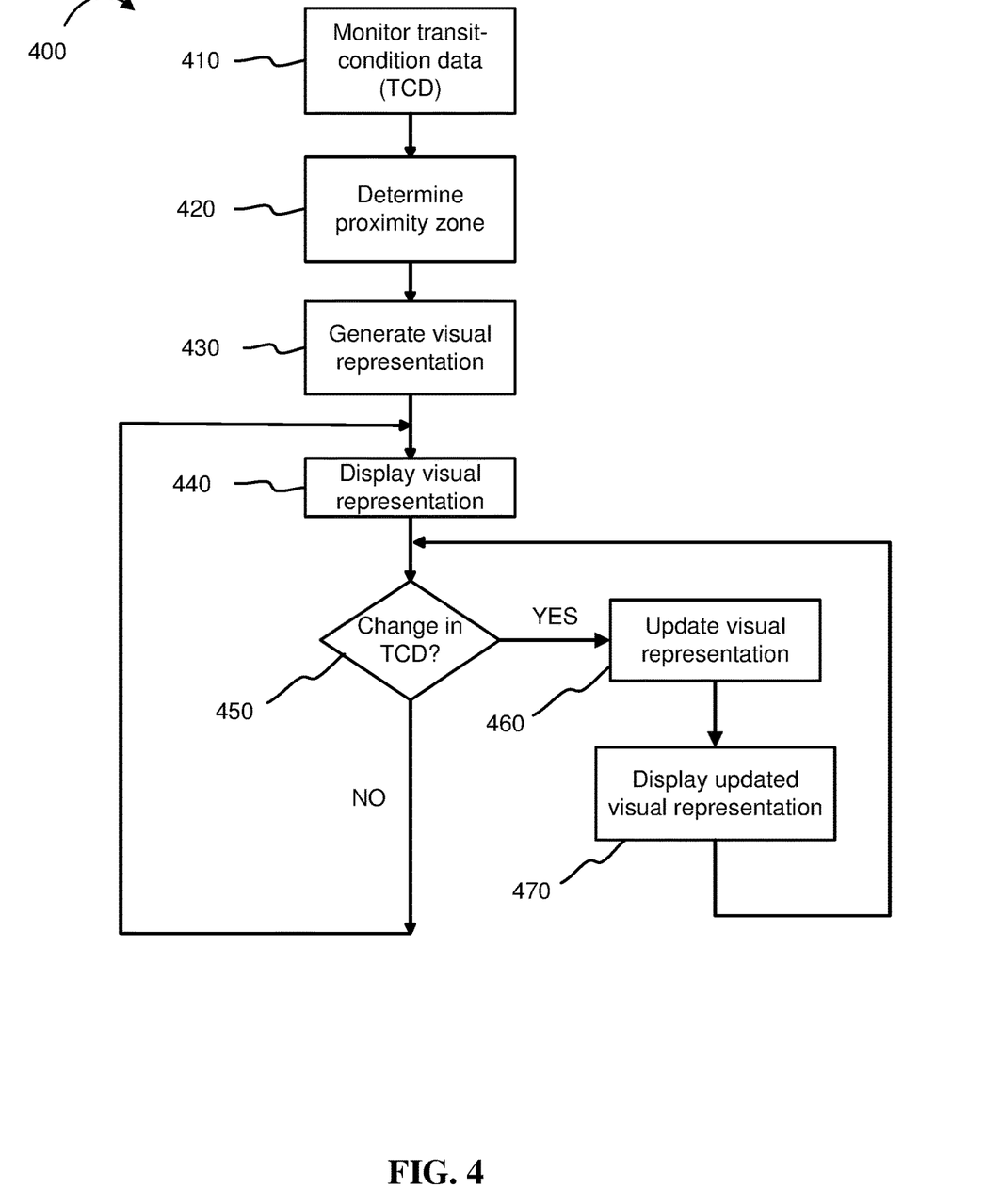
FIG. 4 depicts a flowchart of an example method for displaying a visual representation, in accordance with embodiments of the present disclosure.

FIG. 4 illustrates an example method 400 for displaying and updating a visual representation, according to an embodiment of the present disclosure.

Step 410 may include monitoring transit-condition data, such as roadway-characteristic data, ambient-environment data, user-vehicle data, and/or roadway-vehicle data. Such monitoring may occur continuously or periodically using devices, such as sensing devices, cameras, global positioning system ("GPS") devices, speedometers, accelerometers, in-vehicle data storage/processing devices, and/or web-based resources.

Step 420 may include determining a proximity zone. Such determining may be accomplished using techniques such as mathematical correlations, image analysis techniques, and machine learning. For example, to determine a proximity zone regarding a safe distance for a roadway vehicle to merge in front of a user vehicle in a rainy environment, a processor may establish mathematical relationships between variables such as a weight of the user vehicle, relative velocities of the vehicles, and a calculated distance required for the user vehicle to come to a complete stop on a wet roadway.

Step 430 may include generating a visual representation. Such generating may include determining the form of the visual representation to be displayed and executing commands to display the visual representation.

Step 440 may include displaying the visual representation. Continuing with the example above, the visual representation may take the form of a colored bar projected onto the roadway that indicates to an observer that merging ahead of the colored bar would be safer than merging behind the colored bar.

Step 450 may include detecting a change in the transit-condition data. Continuing with the example above, a sensing device on the user vehicle may monitor a transit condition such as a weather condition, such as whether the user vehicle is located in a rainy environment or a dry environment. If the user vehicle remains in a rainy environment and other transit conditions remain constant, the same visual representation would continue to be displayed. However, a detected change in a transit condition, such as the user vehicle no longer being located in a rainy environment, would require a step 460 to update the visual representation based on a changed proximity zone.

For example, a user vehicle moving from a wet, rainy environment to a dry environment may result in a changed proximity zone. Due to higher roadway traction in a dry environment than in a wet environment, a roadway vehicle may be able to safely merge in front of a user vehicle within a shorter distance in the dry environment.

To account for monitored changes in transit condition data, method 400 may include step 470 to display an updated visual representation. Method 400 may also continue to monitor the transit conditions for one or more changes in transit-condition data.

Figure 5:
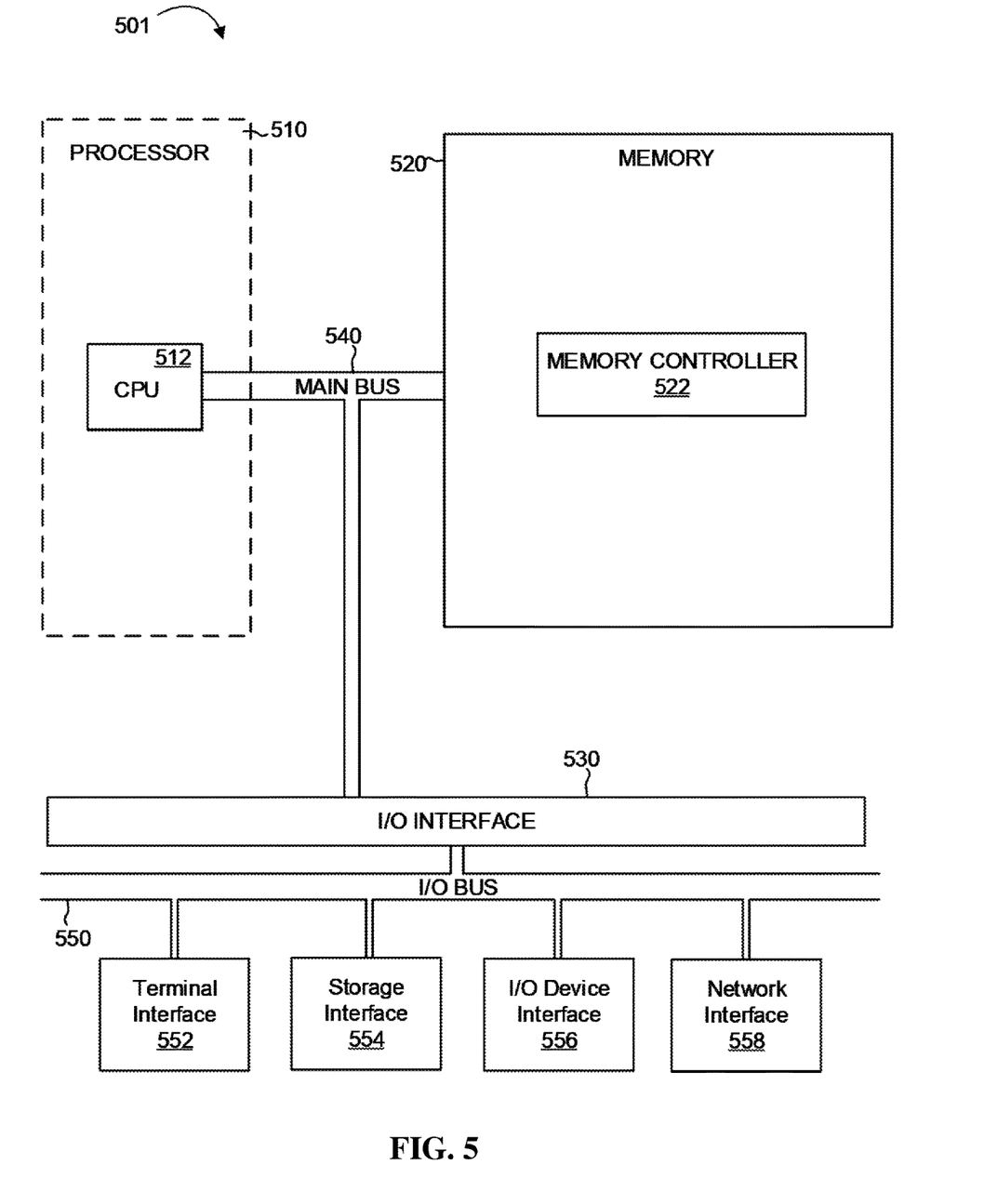
FIG. 5 depicts the representative major components of a computer system that may be used in accordance with embodiments of the present disclosure.

FIG. 5 depicts the representative major components of an exemplary Computer System 501 that may be used in accordance with embodiments of the present disclosure. The particular components depicted are presented for the purpose of example only and are not necessarily the only such variations. The Computer System 501 may comprise a Processor 510, Memory 520, an Input/Output Interface (also referred to herein as I/O or I/O Interface) 530, and a Main Bus 540. The Main Bus 540 may provide communication pathways for the other components of the Computer System 501. In some embodiments, the Main Bus 540 may connect to other components such as a specialized digital signal processor (not depicted).

The Processor 510 of the Computer System 501 may be comprised of one or more CPUs 512. The Processor 510 may additionally be comprised of one or more memory buffers or caches (not depicted) that provide temporary storage of instructions and data for the CPU 512. The CPU 512 may perform instructions on input provided from the caches or from the Memory 520 and output the result to caches or the Memory 520. The CPU 512 may be comprised of one or more circuits configured to perform one or methods consistent with embodiments of the present disclosure. In some embodiments, the Computer System 501 may contain multiple Processors 510 typical of a relatively large system. In other embodiments, however, the Computer System 501 may be a single processor with a singular CPU 512.

The Memory 520 of the Computer System 501 may be comprised of a Memory Controller 522 and one or more memory modules for temporarily or permanently storing data (not depicted). In some embodiments, the Memory 520 may comprise a random-access semiconductor memory, storage device, or storage medium (either volatile or non-volatile) for storing data and programs. The Memory Controller 522 may communicate with the Processor 510, facilitating storage and retrieval of information in the memory modules. The Memory Controller 522 may communicate with the I/O Interface 530, facilitating storage and retrieval of input or output in the memory modules. In some embodiments, the memory modules may be dual in-line memory modules.

The I/O Interface 530 may comprise an I/O Bus 550, a Terminal Interface 552, a Storage Interface 554, an I/O Device Interface 556, and a Network Interface 558. The I/O Interface 530 may connect the Main Bus 540 to the I/O Bus 550. The I/O Interface 530 may direct instructions and data from the Processor 510 and Memory 520 to the various interfaces of the I/O Bus 550. The I/O Interface 530 may also direct instructions and data from the various interfaces of the I/O Bus 550 to the Processor 510 and Memory 520. The various interfaces may comprise the Terminal Interface 552, the Storage Interface 554, the I/O Device Interface 556, and the Network Interface 558. In some embodiments, the various interfaces may comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—may communicate failures and changes to one or more components to a hypervisor or operating system (not depicted). The hypervisor or the operating system may allocate the various resources available in the Computer System 501 and track the location of data in Memory 520 and of processes assigned to various CPUs 512. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
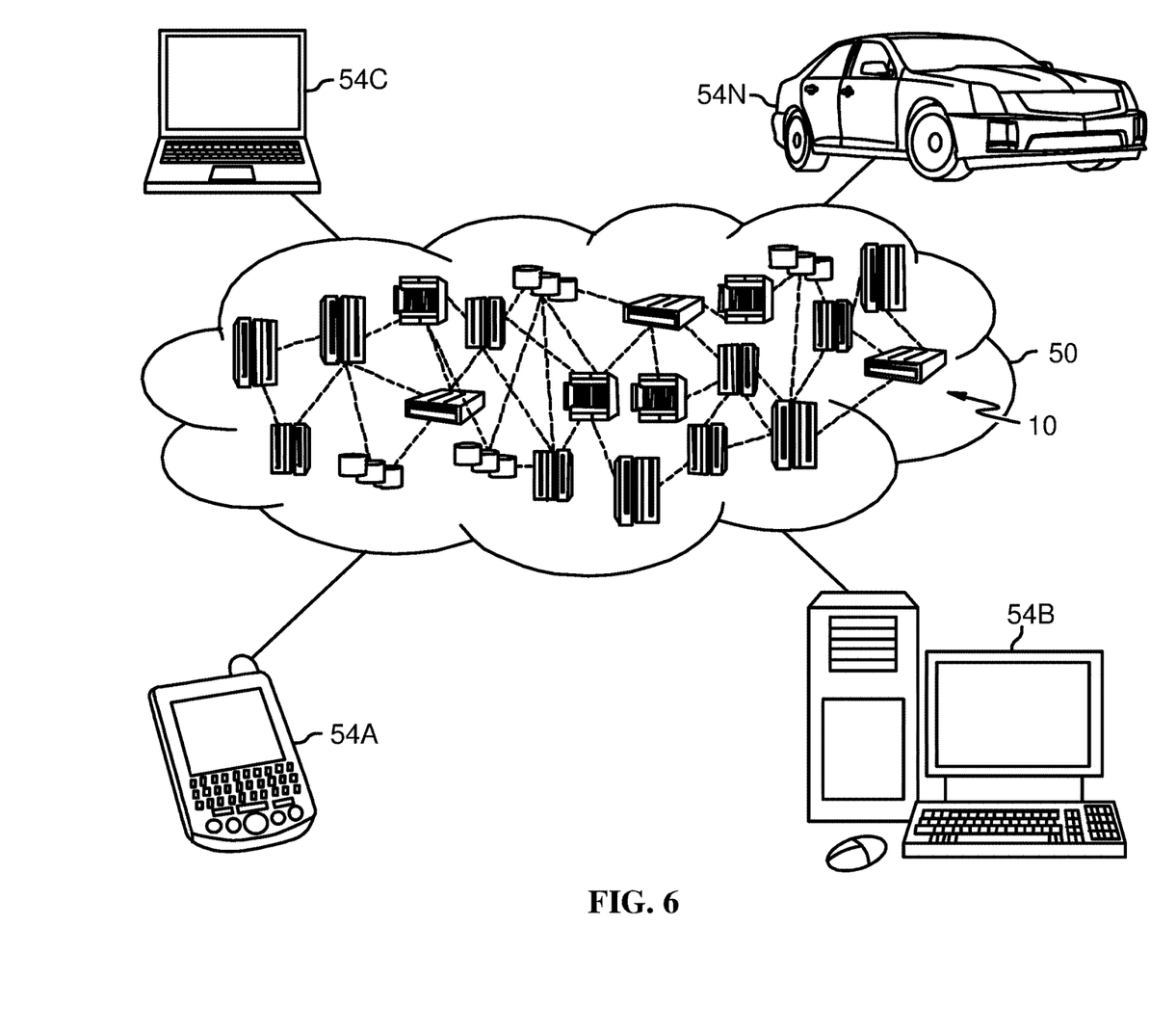
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
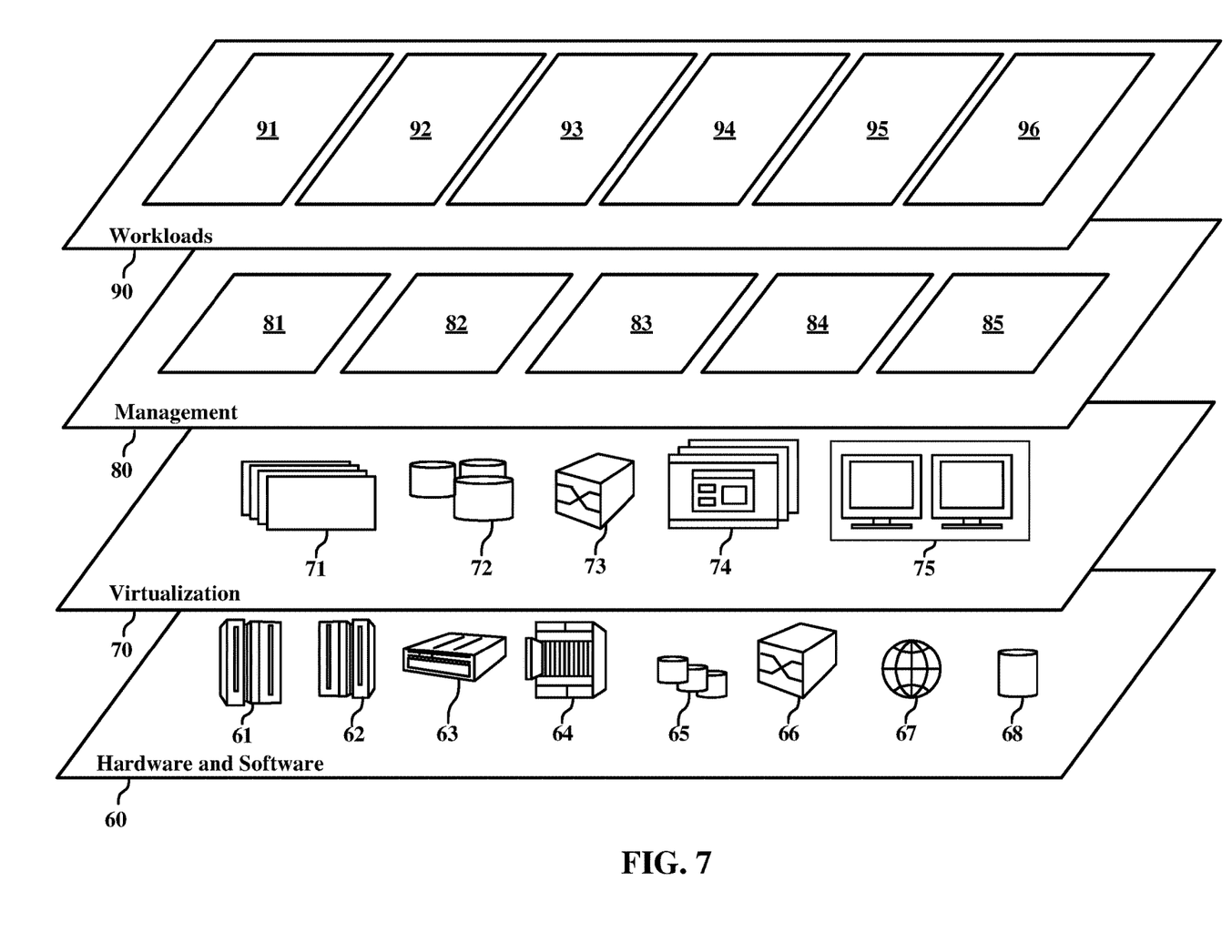
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and proximity logic 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   monitoring transit-condition data of a roadway traversed by a user vehicle, the roadway, comprising a set of lane markers attached to the roadway, wherein the transit-condition data comprises roadway-characteristic data;
   determining, based at least in part on the roadway-characteristic data, a first proximity zone;
   generating a first visual representation that corresponds to the first proximity zone;
   displaying the first visual representation onto the set of lane markers, the displaying comprising continuously projecting the first visual representation onto the set of lane markers by continuously detecting lane marker positions corresponding to the set of lane markers;
   detecting a change in the transit-condition data; and
   updating the first visual representation in response to the detecting, resulting in an updated first visual representation.

2. The method of claim 1, wherein updating the first visual representation comprises modifying an angle at which the first visual representation is displayed, in response to a detected change in curvature of the roadway.

3. The method of claim 1, wherein updating the first visual representation includes modifying a distance from the user vehicle where the first visual representation is displayed, in response to a detected change in curvature of the roadway.

4. The method of claim 1, wherein updating the first visual representation includes modifying the first visual representation in response to a detected change in surface traction of the roadway.

5. A system comprising:
   a set of sensors configured to monitor transit-condition data of a user vehicle in transit on a roadway, the roadway comprising a set of lane markers attached to the roadway, wherein the transit-condition data comprises swerving information corresponding to the user vehicle;
   a processor configured to determine, based at least in part on the swerving information, a first proximity zone,
      wherein the processor is configured to generate a first visual representation that corresponds to the first proximity zone;
   a set of illumination devices configured to display the first visual representation onto the set of lane markers, the display comprising a continuous projection of the first visual representation onto the set of lane markers by continuously detecting lane marker positions corresponding to the set of lane markers;
   the processor further configured to update the first visual representation in response to a detected change in the swerving information, resulting in an updated first visual representation.

6. The system of claim 5, wherein updating the first visual representation includes modifying a shape of the first visual representation in response to a turn executed by the user vehicle.

7. The system of claim 5, wherein updating the first visual representation includes modifying a distance between a location of the user vehicle and a location at which the first visual representation is displayed, in response to detecting the user vehicle having a changed driving pattern.

8. The system of claim 5, wherein the set of sensors is configured to detect one or more physical characteristics of the set of lane markers.

9. The system of claim 5, wherein the first visual representation comprises a set of alphanumeric characters corresponding to a characteristic of the user vehicle.

10. The system of claim 5, wherein the system further comprises an audio device configured to emit an audible alert when a roadway vehicle enters the first proximity zone.

11. A system comprising:
    a processor; and
    a memory in communication with the processor, the memory containing program instructions that, when executed by the processor, are configured to cause the processor to perform a method, the method comprising:
       monitoring transit-condition data of a roadway traversed by a user vehicle, the roadway comprising a set of lane markers attached to the roadway,
    wherein the transit-condition data comprises ambient-environment data;
    determining, based at least in part on the ambient-environment data, a first proximity, zone;
       generating a first visual representation that corresponds to the first proximity zone;
       displaying the first visual representation onto the set of lane markers, the displaying comprising continuously projecting the first visual representation onto the set of lane markers by continuously detecting lane marker positions corresponding to the set of lane markers;
    detecting a change in the transit-condition data; and
    updating the first visual representation in response to the detecting, resulting in an updated first visual representation.

12. The system of claim 11, wherein the first visual representation corresponds to a detected weather condition.

13. The system of claim 11, wherein updating the first visual representation includes modifying the first visual representation in response to a detected change in a weather condition.

14. The system of claim 11, wherein the method further comprises causing an audio device to emit an audible alert when a roadway vehicle enters the first proximity zone.

15. The method of claim 1, wherein updating the first visual representation includes modifying a distance between a location of the user vehicle and a location at which the first visual representation is displayed, in response to detecting the user vehicle having a changed driving pattern.

16. The system of claim 11, wherein updating the first visual representation includes modifying a distance between a location of the user vehicle and a location at which the first visual representation is displayed, in response to detecting the user vehicle having a changed driving pattern.

* * * * *